P. B. SCHELL.
BIN.
APPLICATION FILED FEB. 19, 1913.

1,076,456.

Patented Oct. 21, 1913.

2 SHEETS—SHEET 1.

Witnesses
W. S. McDowell.
C. Edworton Jr.

Inventor
P. B. Schell.
By Victor J. Evans
Attorney

COLUMBIA PLANOGRAPH CO., WASHINGTON, D. C.

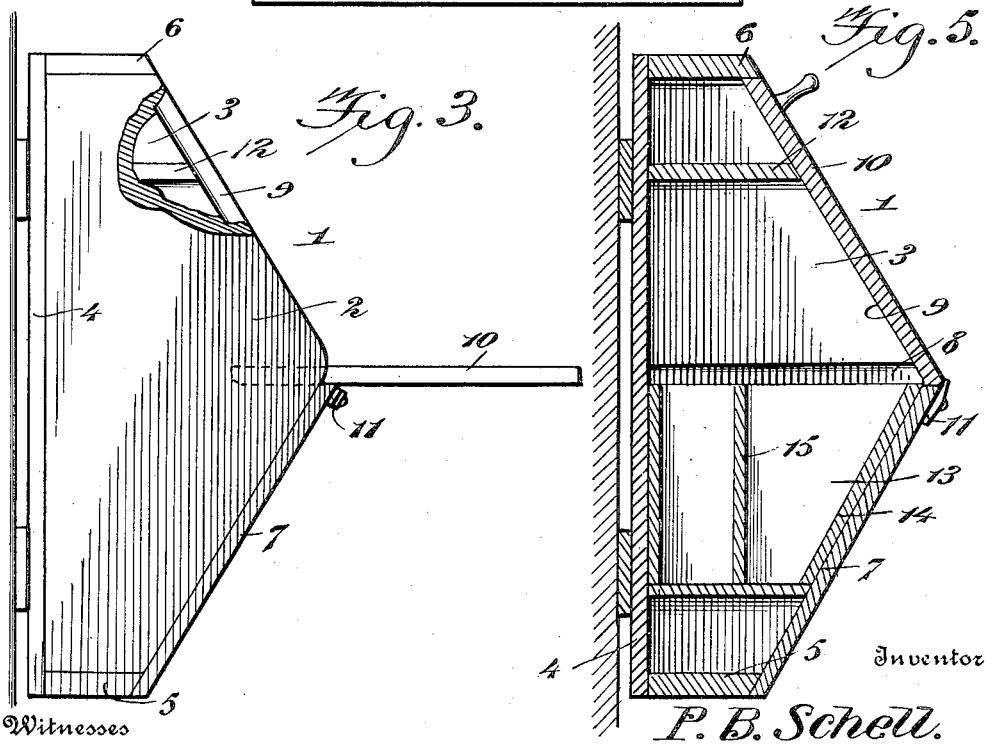

UNITED STATES PATENT OFFICE.

PERRY B. SCHELL, OF BLUE CANYON, CALIFORNIA.

BIN.

1,076,456. Specification of Letters Patent. Patented Oct. 21, 1913.

Application filed February 19, 1913. Serial No. 749,489.

*To all whom it may concern:*

Be it known that I, PERRY B. SCHELL, a citizen of the United States, residing at Blue Canyon, in the county of Placer and State of California, have invented new and useful Improvements in Bins, of which the following is a specification.

This invention relates to bins and more particularly to flour bins.

One of the principal objects of the invention is to provide a simple and efficient device of this character whereby the lid or cover may be turned into operative position and used as a kneading board.

A further object of the invention is the provision of a device of this character having removable bins separate from the casing whereby they may be conveniently disconnected.

Further objects of this invention will appear as the following specific description is read in connection with the accompanying drawings which form a part of this application, and in which:—

Figure 1:
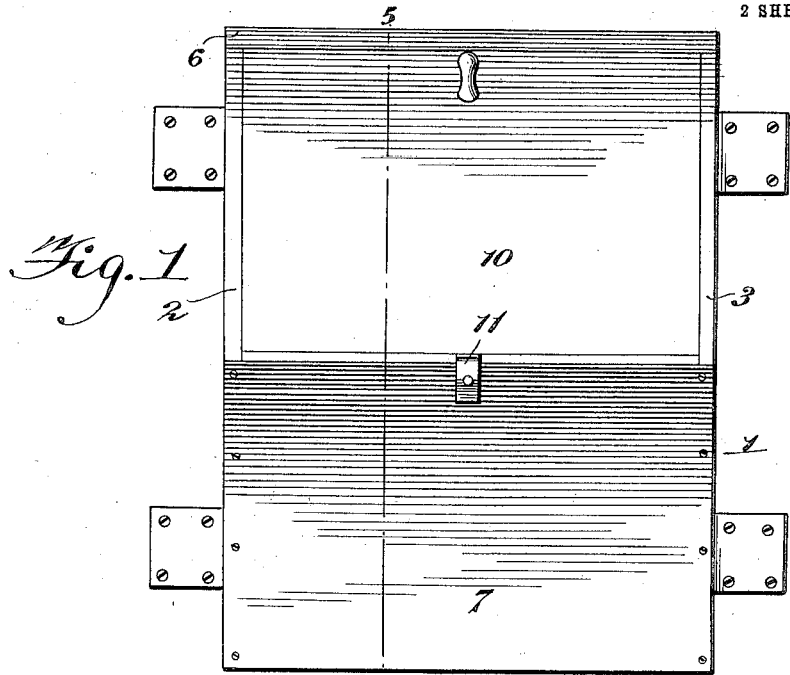
Figure 2:
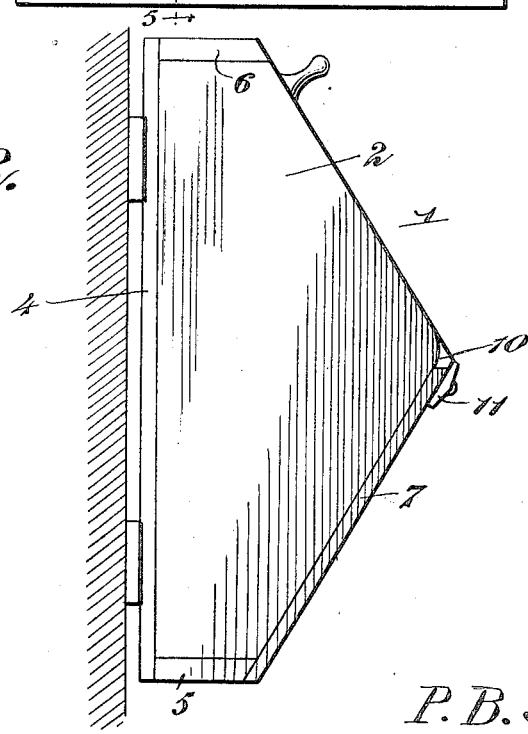

Figure 1 is a front elevation. Fig. 2 is a side elevation. Fig. 3 is a side elevation with the cover or lid shown in position as a kneading board. Fig. 4 is a front view with the cover or lid removed. Fig. 5 is a vertical sectional view taken on the line 5—5 of Fig. 1.

Referring more particularly to the drawing 1 represents a casing which consists of side plates 2 and 3, a back plate 4, bottom and top plates 5 and 6 respectively and a front plate 7. The side plates or pieces are substantially triangular in form so that the front plate inclines outwardly from the bottom to the center of the side plates where its upper edge is flush with the bottom walls of grooves 8 formed in the inner walls of the side plates 2 and 3. The front edges of these side plates are also rabbeted out as shown at 9 to receive the combined cover and kneading board 10 which is adapted to fit in the rabbets and be held in operative position as a cover by means of the turn button 11. When the board is used for kneading or molding it is removed from the rabbets and slid into the grooves 8 as far as is desired as indicated in Fig. 3. The lower portion of the device which is closed by the front plate 7 is adapted to receive flour while the upper portion above the grooves 8 has secured therein the shelf 12 upon which yeast powder and such articles may be kept.

Removably mounted in the lower portion of the bin is a removable receptacle 13 having an inclined front 14 to conform with the inclined front piece 7. This receptacle is separated into separate compartments by a partition 15 so as to be adapted to carry two different kinds of meal. The molding or kneading board may be reinforced in any suitable manner so as to withstand the strains to which it is subjected.

The device is preferably attached to the wall by means of fastening devices which pass through the battons 16 secured to the back piece 4 and projecting beyond the ends of the casing as shown.

What is claimed is:—

A bin comprising substantially triangular side pieces, a back piece, top and bottom pieces, a front piece inclined from the bottom pieces to the center of the side pieces, said side pieces having their front edges rabbeted above the top edge of the front piece, said side pieces provided with horizontal internal grooves, a cover piece adapted to seat in said rabbets between the top edge of the front piece and the top piece and to slide in said horizontal grooves to provide a kneading surface, and a removable receptacle freely arranged in and fitting the bin and covered by the cover piece when in position in the grooves, said receptacle adapted to be adjusted transversely of the bin.

In testimony whereof I affix my signature in presence of two witnesses.

PERRY B. SCHELL.

Witnesses:
CHAUNCEY H. DUNN,
CLYDE H. BRAND.

Copies of this patent may be obtained for five cents each, by addressing the "Commissioner of Patents, Washington, D. C."